Dec. 15, 1970 J. A. FELTS 3,548,394

ROTATING MAGNETIC DISC STORAGE STRUCTURE

Filed Feb. 26, 1968 3 Sheets-Sheet 1

INVENTOR:
John A. Felts

By Don Shields
ATTORNEY

Dec. 15, 1970 J. A. FELTS 3,548,394

ROTATING MAGNETIC DISC STORAGE STRUCTURE

Filed Feb. 26, 1968 3 Sheets-Sheet 2

INVENTOR:
John A. Felts

By Don Shields
ATTORNEY

ROTATING MAGNETIC DISC STORAGE STRUCTURE

INVENTOR:
John A. Felts

By Don Shields

ATTORNEY

United States Patent Office 3,548,394

Patented Dec. 15, 1970

3,548,394

ROTATING MAGNETIC DISC STORAGE STRUCTURE

John A. Felts, Los Angeles, Calif., assignor to Scientific Data Systems, Inc., Santa Monica, Calif., a corporation of Delaware Filed Feb. 26, 1968, Ser. No. 708,167

Int. Cl. G11b *5/84, 17/00*

U.S. Cl. 340—174.1 12 Claims

ABSTRACT OF THE DISCLOSURE

A cantilever bearing for a magnetic memory which rotates rapidly to permit fast access to the information recorded thereon. The rotating magnetic assembly includes a hub mounted on a shaft which supports at its other end an electric motor. This permits removal of either the magnetic assembly or the motor without disassembling the bearings. Two bearings are disposed between the hub assembly and the motor. One of the bearings is arranged at or closely adjacent to the center of gravity of the rotating magnetic assembly, which minimizes vibration of the assembly and its sensitivity to gravity.

This invention relates generally to rotating magnetic memories of the type used with digital computers, and particularly relates to a cantilever bearing for a rapidly rotating magnetic disc which provides rapid access to the information recorded thereon.

For modern high-speed digital computers of the type which permit time-sharing and the control of processes in real time, a memory is required which is relatively large and which permits rapid access to the information recorded thereon. The reason for this is that one program may have to be interrupted by the computer for a higher priority program. In that case instructions and partial results of the interrupted program must be stored while instructions for the new program must be rapidly obtained.

For this and other purposes it has been found convenient to use a so-called disc memory. The disc memory consists of one or more discs which have been coated with a magnetic material to permit recording of digital information thereon. In order to obtain the desired rapid access, the discs may have to be rotated at a fairly high speed, such as 1800 r.p.m. (revolutions per minute). Furthermore, to obtain a sufficiently large storage capacity, it is highly desirable that the packing density of the recording bits be high. This, in turn, permits a large transfer rate of bits which may have to be on the order of 3 mc. The transfer rate is the speed at which bits may be read from the disc or written back on the disc.

For such a rapidly rotating disc memory, it is quite important that the distance between the rotating disc and the read and write heads be very small, such as on the order of 15 microinches, a microinch being a millionth of an inch.

In general, on the one hand, the magnetic heads should be as close to the disc as possible to improve the signal strength of a bit read off the disc and to minimize the lateral spread of the recording magnetic field. On the other hand, if the disc and the heads touch, one or the other may be ground off with resulting damage to the disc assembly. Even scratching of the disc by a magnetic head may damage the disc. Also, it will be apparent that the packing or recording density may be higher if the write head is closer to the recording medium.

In order to facilitate field maintenance of disc files, it is highly desirable to provide for removal of defective discs and other components in the field without disturbing the factory alignment of the magnetic heads with respect to the spindle and without disturbing bearing alignments. In accordance with the invention described herein, a cantilever shaft is provided for holding the discs in a way that allows removal of the discs without disturbing the bearings. The cantilever shaft described in one embodiment herein is in the horizontal plane. When the drive shaft must be arranged in a horizontal direction, it is more difficult to support the shaft so as to minimize or substantially eliminate vibrations or mechanical gyrations of the disc and the like. Thus, if the drive shaft is deflected by the weight of the disc assembly, this will cause the disc to assume a cantered or tilted angle and the disc is now subject to gravity. If the disc rotates at a high enough speed it may begin to nutate like a top. If the shaft is too yielding or compliant, either the shaft or the disc may be destroyed due to excessive bending, particularly if the disc now runs in a radial or tangential fashion due to the deflection of the shaft. Obviously this will either impede the reliability of a rapid access disc file or will necessitate a great reduction of the rotational speed of the disc. Furthermore, any large relative movement between the disc and the magnetic heads may cause damage to either or both.

It is accordingly an object of the present invention to facilitate assembly and disassembly of a rotating disc memory in the field without removing the bearing assembly for the purpose of replacing discs or for shipping the assembly.

Another object of the invention is to provide a disc memory including a hub assembly for supporting one or more magnetic discs and means supporting the hub assembly on the drive shaft in cantilever fashion so that one bearing is disposed at or near the center of gravity of the disc assembly, thereby to minimize the vibration of the drive shaft of a rotating disc memory and subsequent vibration of the magnetic discs attached thereto, the bearings being so arranged that there is substantially no mechanical couple or moment acting on the hub assembly.

A further object of the invention is to facilitate the removal and replacement of a disc hub assembly on the shaft of a rotating memory so that the disc hub assembly may be removed and repositioned in the field in the same plane intersecting the drive shaft within extremely close tolerance.

In accordance with the present invention there is provided a rapid access fast-rotating disc memory of the type suitable for use with digital computers. The disc memory includes a hub assembly on which one or more magnetic discs may be mounted. The hub assembly is rotatably supported by a drive shaft. An electric motor drives the shaft. The bearing assembly has two bearings spaced from each other and disposed substantially adjacent one side of the hub assembly. One of the bearings is arranged at or close to the center of gravity of the hub assembly. This arrangement minimizes any mechanical couple or moment acting on the disc assembly which might tend to vibrate the attached disc or cause it to nutate. Furthermore, since the hub assembly and optionally the electric motor are both supported in cantilevered fashion, either may be readily disassembled without removing the bearings. Thus, a two bearing system is provided for drive and disc so as to eliminate the alignment, vibration and couplings necessary in systems having more than two bearings.

The hub assembly is preferably removably secured to the shaft so as to permit precise repositioning of the hub so that the disc is exactly perpendicular to the shaft. This may, for example, be effected by providing a conical surface on the shaft and a conical washer, between which a special sleeve of the hub assembly is precisely located so that it can be disassembled and relocated in substantially the same position with a great degree of precision.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 5:
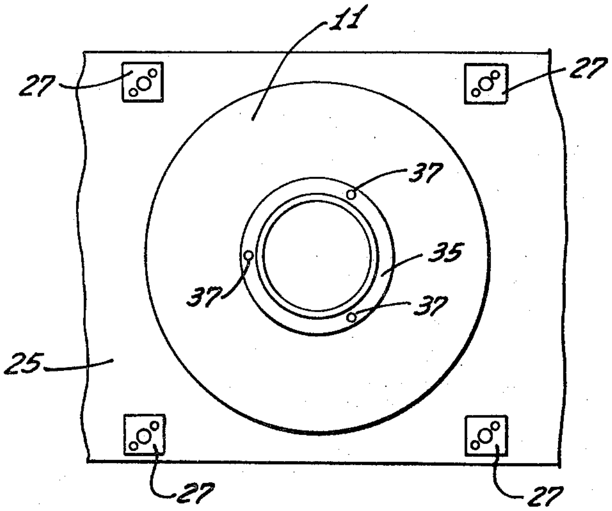
FIG. 5 is a cross-sectional view taken on line 5—5 of FIG. 1 and illustrating particularly one of the recording discs.
Figure 6:
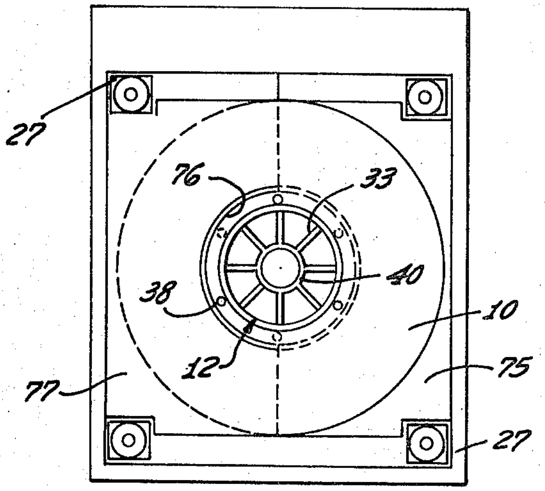
FIG. 6 is an end view similar to that of FIG. 4 but illustrating particularly the head mounting plates on which the magnetic heads are mounted.
Figure 7:
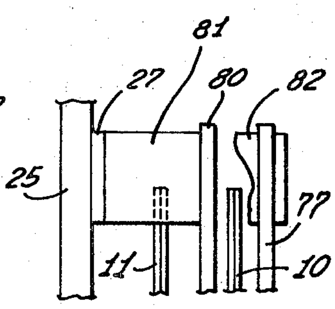
FIG. 7 is a side elevational view, parts being broken away, to illustrate particularly the head mounting plates in relation to the discs.
Figure 8:
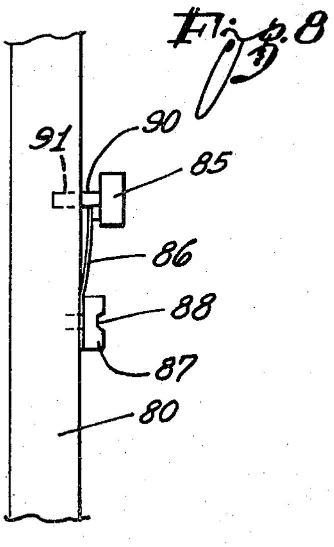
FIG. 8 is a side elevational view, on enlarged scale similar to that of FIG. 7 but showing particularly one of the magnetic heads mounted on its head mounting plate.

Referring now to the drawings, and particularly to FIGS. 1–5, there is illustrated a magnetic disc memory embodying the present invention. It should be noted that the head mounting plates on which the magnetic read or write heads are mounted, are not shown in FIGS. 1–5. They are illustrated in FIGS. 6–8, which will be subsequently described.

As shown in FIGS. 1–5, the disc memory may include a pair of discs 10, 11 which are rotatably mounted on a hub assembly generally indicated as 12. The hub assembly is mounted on a drive shaft 14 which supports, besides the hub assembly 12, an electric motor indicated at 15. The motor may consist of a stator 16 and a rotor 17. The electric motor 15 may be disposed in an apertured motor housing 18 having an end plate 20 screwed to the housing 18, for example, by screws 21.

There is also provided a fixed spindle housing 23 for fixedly supporting the drive shaft 14. The spindle housing 23 may be supported by a bulkhead plate 25, which in turn is suitably secured, for example, by screws, to a base plate 26. The bulkhead plate 25 may be provided with suitable positioning blocks 27 on opposite sides thereof and disposed in the upper and lower parts of the plate for positioning the head mounting plates as will be described in connection with FIGS. 6–8. The disc assembly is preferably protected by a suitable cover 28 shown in FIG. 1.

Figure 1:
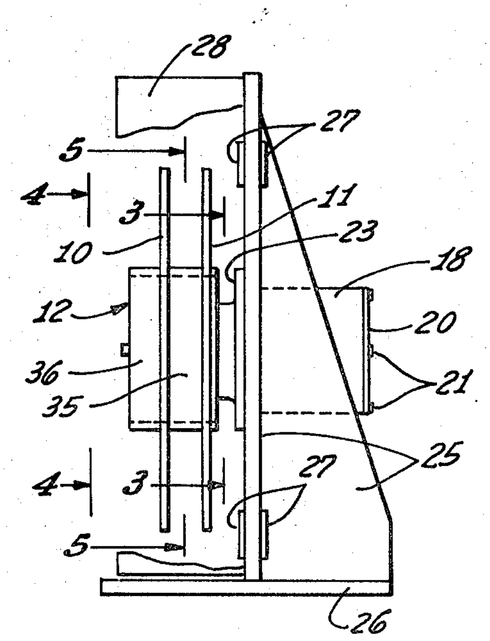
FIG. 1 is a side elevational view, parts being broken away, of a hub assembly with its drive motor and showing a portion of a fixed bulkhead plate for mounting the magnetic heads.
Figure 2:
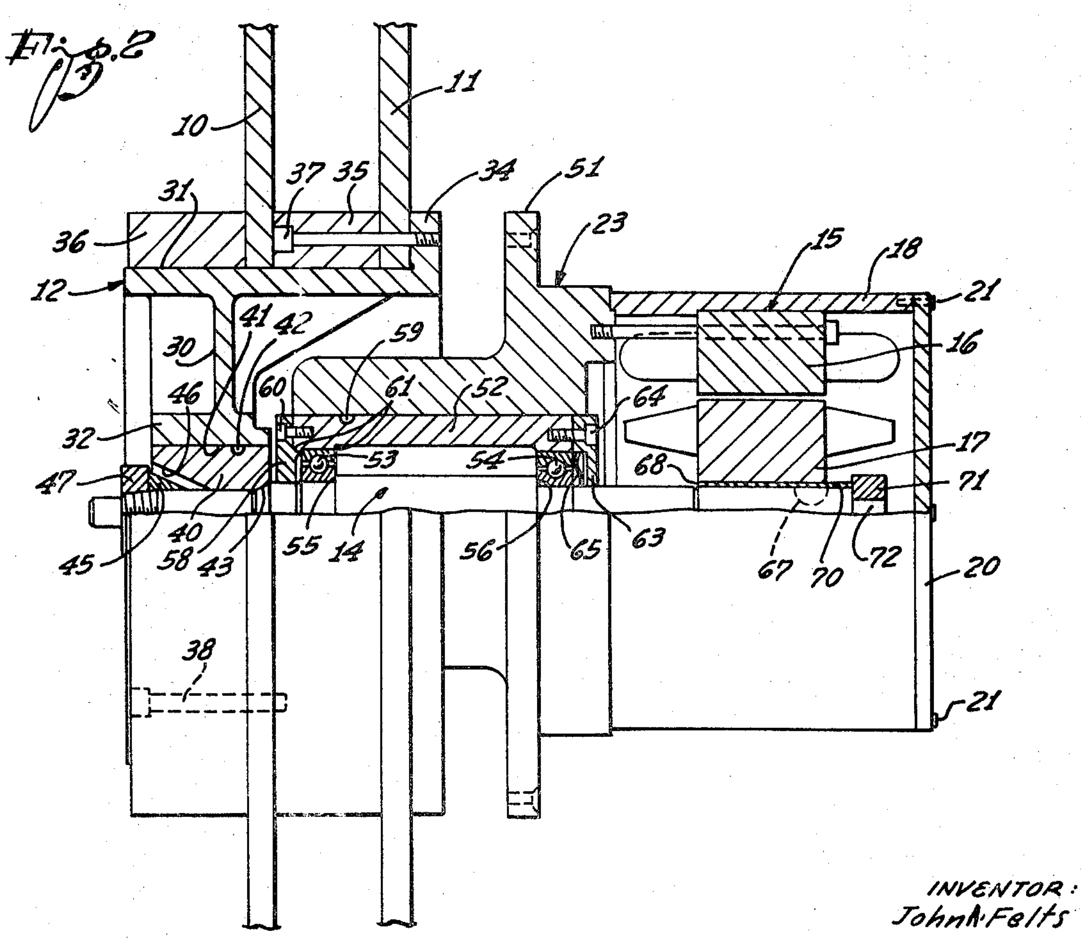
FIG. 2 is a side elevational view similar to that of FIG. 1 but partly in section and an enlarged scale to show the drive shaft and discs.
Figure 3:
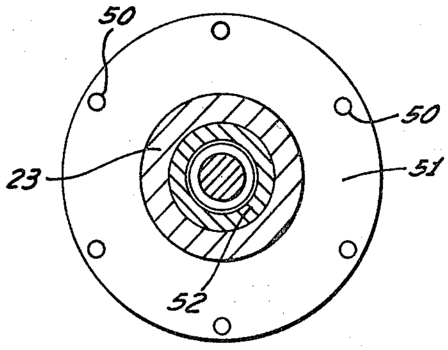
FIG. 3 is a cross-sectional view taken on line 3—3 of FIG. 1 and showing particularly the drive shaft.
Figure 4:
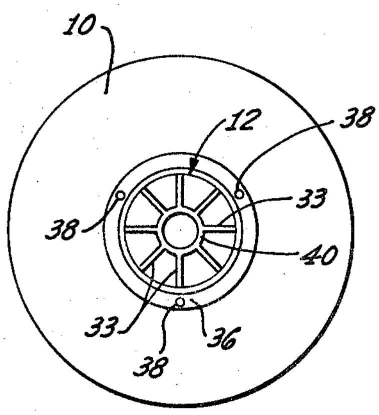
FIG. 4 is an end view of the assembly of FIG. 1 taken as shown by line 4—4 of FIG. 1.

The hub assembly 12 includes two discs 10 and 11 mounted on a disc hub 30. The disc hub 30 has an outer cylindrical surface 31 on which the discs rest, and an inner cylindrical portion 32, which is much shorter than the outer surface 31. Accordingly, the hub assembly 12 and particularly its outer portion extend beyond the inner portion 32. The disc hub 30 is provided with radial spokes 33, as clearly shown in FIG. 4. The disc hub 30 is also provided with a radially extending flange 34 having an outer diameter substantially equal to that of a pair of cylindrical spacers 35 and 36, which serve the purpose of spacing the two discs 10, 11 precisely from each other. The spacer 35 is secured to the disc hub 30 by means of a set of, say, three screws 37 which extend through the disc 11 and are screwed into the flange 34 of the hub 30. Preferably, as shown, the screws 37 are socket head cap screws so that they are flat against the next disc 10. In a similar manner the cylindrical spacer 36 is secured to the spacer 35 by another set of three screws 38 which extend through the disc 10 and which may also be socket head cap screws. Each set of screws 37 and 38 is equally spaced circumferentially while one set of screws is offset with respect to the other as shown in FIGS. 2, 4 and 5.

The disc hub 30 in turn is mounted on a sleeve 40 which has an outer cylindrical surface 41. The right hand portion of surface 41 as viewed in FIG. 2 preferably is knurled to provide a press or force fit with the disc hub 30. The surface 41 may be provided with a small depression 42 for accommodating any chips that may form when the hub 30 is pressed into the sleeve 40.

In accordance with the present invention the entire hub assembly including the disc hub 30 with its discs 10, 11 and the hub 40 are so mounted on the drive shaft 14 that they may be removed and repositioned with an accuracy which may be on the order of 0.1 mil (one mil being one-thousandth of an inch). Accordingly, it will be appreciated that the entire hub assembly may be removed from the drive shaft 14 for repair in the field or for shipping the disc file. The same hub assembly or a repaired hub assembly may then be replaced on the drive shaft 14 and may be repositioned within substantially the same plane intersecting the drive shaft at right angles thereto. This in turn makes it possible to locate the magnetic heads in the same position with respect to the discs without readjustment.

To this end the sleeve 40 has an inner rearwardly extending conical surface 43 which matches with a corresponding conical surface on the drive shaft 14. Furthermore, the sleeve 40 is provided with an inner forwardly extending conical surface 43. A conical hub positioning washer 45 is slidable over drive shaft 14 and is pushed against the conical surface 46 of the sleeve 40. A lock nut 47 screws onto a screw-threaded outer portion of the drive shaft 14. Hence it tends to press the conical washer 45 against conical inner surface 46 of the sleeve 40 and the sleeve 40 against the conical surface on the drive shaft 14. As a result the sleeve 40 is precisely located between two pairs of matching conical surfaces.

The purpose of the sleeve 40 is to accommodate the different coefficients of expansion of the hub 30 and the shaft 14. Thus the shaft 14 may consist of hardened steel while the hub 30 preferably is made of aluminum. These two materials of course expand differently when the temperature changes. Furthermore, a soft material such as aluminum could not be rematched when it has a press or force fit. Such a soft material will abrade or gall and may produce ridges when it is press fitted and these ridges will never rematch again. Therefore, the sleeve 40 may consist of some suitable steel which has a coefficient of expansion between that of the aluminum hub 30 and that of the hardened steel shaft 41 and which has relatively hard non-deformable surfaced.

It will be noted that since the hub 30 is made of aluminum it is relatively lightweight. On the other hand, the sleeve 40 being of steel may be heavier. Therefore, since the hub and particularly the outer hub portion 31 are relatively lightweight, vibration of the hub and subsequently of the two magnetic discs 10 and 11 is minimized.

The spindle housing 23 which retains the bearings in which shaft 14 rotates is fixed to the bulkhead plate 25, for example, by a plurality of screws 50. These screws extend through a bulkhead mounting flange 51 forming part of the spindle housing 23. The spindle housing 23 has an inner cylindrical surface for receiving an inner sleeve 52 which serves as a fixed support for a pair of thrust bearings 53, 54. Any bearing capable of taking a lateral thrust may be used; preferably the bearings 53, 54 are deep groove radial bearings. Preferably the bearing supporting sleeve 52 has a press fit with the spindle housing 23. For example, the sleeve 52 may have a smooth portion to the right of an annular depression or relief 59, while the outer surface of the sleeve to the left of the relief may be knurled. The purpose of the relief 59 is to receive any chips which may be created when sleeve 52 is press-fitted into the spindle housing 23.

The thrust bearing 53 is located against a shoulder 55 on the drive shaft 14. Similarly, the bearing 54 is located against a shoulder 56 on the drive shaft 14. The bearing 53 is held in place by a bearing retainer plate 58 which may be secured to the sleeve 52 by screws 60. The bearing retainer plate 58 may be provided with an annular projection 61 bearing against the thrust bearing in a manner similar to that of shoulder 55 bearing against the bearing.

The other thrust bearing 54 is held in place by a cap or plate 63 which is secured to the sleeve 52 by screws 64. The thrust bearing 54 is spring-loaded by one or more spring washers 65 against its shoulder 56 which is the reference point for the drive shaft 14. The spring washer 65 is convoluted and has three high spots along its circumference. The required pre-loading may be obtained by utilizing more than one spring washer in series if needed, and by providing one or more shims. These shims will compress the spring washer to the required extent so that the bearing may be pre-loaded to, say, 70 pounds. Accordingly, the drive shaft 14 is relatively fixed in a radial plane with respect to the spindle housing 23 so that the hub assembly 12 is precisely located with respect to the bulkhead mounting flange 51 in spite of temperature variations.

The motor rotor 17 is fixed to the rear portion of the drive shaft 14 by means of a Woodruff key 67. The rotor 17 is pressed against a shoulder 68 on the drive shaft 14 by means of a spacer sleeve 70 and a lock nut 71 screwed on the threaded rear portion 72 of the drive shaft.

In accordance with the present invention the front thrust bearing 53 is disposed at or near the center of gravity of the entire hub assembly 12. The hub assembly includes the two discs 10, 11, the two spacers 35, 36, the hub 30 and its sleeve 40. It will be noted that the center of gravity is adjacent to the sleeve 40 due to the overhang of the disc hub 30 towards the right as shown in FIG. 2. For example, the bearing 53 may be within the order of a quarter of an inch of the actual center of grvity. As expained hereinabove, this will avoid the creation of a mechanical moment which will tend to exert undesirable forces on the rotating discs.

It will also be apparent that the entire hub assembly can be readily removed without the necessity to disassemble the bearing assembly. Similarly, the electric motor 15 can be disassembled, again without removing the bearing assembly.

Thus the disc asembly 12 is mounted in a cantilever fashion, as is the electric motor 15. There is no need to support also the electric motor at its center of gravity, because vibration of the motor will not cause any vibration of the discs. In addition, of course, the motor is light in weight and has a much smaller diameter than the discs. Hence any unbalance of the motor will tend to cause less vibration.

The vertical arrangement of the recording discs 10, 11 makes possible a more efficient utilization of the available floor space.

It should be noted that if the hub assembly 12 is not properly mounted and supported, there may be severe vibrations due to resonance and beat frequencies of the hub assembly. These, of course, are substantially eliminated in accordance with the present invention by supporting the hub assembly by the bearing 53 at or near the center of gravity thereof. It will also be noted that by pressing the hub assembly against the conical surface of the shaft 14 and against the conical washer 45, the hub may be re-registered with an accuracy of better than 0.1 mil. A contributing factor is the relatively hard material of the sleeve 40, which minimizes rubbing or galling.

The included angle of the washer 45 and of the conical surface on the shaft 14 matching the conical recess 43 in the sleeve 40 mãy be on the order of 20°. This angle should be greater than the locking angle between the materials of the shaft 14 and the hub 40 which may consist of different types of steel. This locking angle may be on the order of 16° or less. It is the angle where the materials lock to such an extent that they can only be separated by exerting a considerable force.

It will be understood that while the hub assembly 12 with the discs 10, 11 rotates, the magnetic heads which cooperate with the discs for writing information thereon or reading it off the discs must be mounted fixedly with respect to the discs. To this end there may, for example, be provided a plurality of head mounting plates, one for each surface of a disc. Thus since there are two discs with four surfaces, four such mounting plates may be needed. These are mounted as illustrated in FIGS. 6–8, to which reference is now made.

Thus FIG. 6 illustrates two head mounting plates 75 and 77 which are each of generally semi-cylindrical shape. Plate 77 may have a circular cutout in the center as shown at 76, because the central portion of the disc cannot be used for recording. This is due to the fact that the speed along concentric circles within the central portion is too low for recording. The main purpose of the head mounting plates is to support in a fixed relationship with respect to the rotating discs and the drive shaft 14, one or more read and write heads on both surfaces of each disc 10 and 11. As mentioned before, in order to utilize the space more efficiently, each surface of the disc is coated with a magnetic material and accordingly for each disc there are two sets of heads, one on each surface of the disc. Thus the second head assembly plate 77 may be arranged in front of the recording disc 10. As shown particularly in FIG. 7, a pair of head mounting plates 77 and 80 are disposed on opposite sides of the disc 10. Those head mounting plates associated with the disc 11 are not illustrated.

The two head mounting plates 77 and 80 are spaced from the bulkhead assembly 25 by means of suitable spacers 81, 82 secured to assembly 25. Thus the spacer 81 may be secured to one of the positioning blocks 27. It will thus be seen that the head mounting plates such as 77 and 80 are fixed with respect to and spaced from the respective rotating discs 10 or 11. This arrangement in turn limits the permissible relative movements between the rotating discs and the fixed heads and minimizes interference between the two. If there is such interference between either the heads or other fixed parts and the rotating discs, the discs may get scratched and have to be replaced or else the heads may be destroyed.

FIG. 8, to which reference is now made, is an enlarged side elevational view of one of the head mounting plates, such, for example, as plate 80. By way of example, there is shown schematically one of the magnetic read or write heads 85 which may be a single head or a head bar assembly of a plurality of heads. The magnetic head 85 is yieldingly connected to the head mounting plate 80, for example, by a cantilever reed or spring 86, which in turn is fixed to the head mounting plate 80 by a retainer plate 87 secured to the plate 80 by a suitable screw 88. This permits to bias the head 85 toward the disc with a desired force, such, for example, as 350 grams force. The reed or spring 86 also provides a restoring force to the head tending to urge the head against the disc if they should become too widely separated. The head 85 may be provided with a pin 90 movable in a cylindrical aperture 91 in the head mounting plate to guide the head but permit its movement toward or away from the head mounting plate.

It will be understood that more than one magnetic head such as 85 may be provided on each head mounting plate, depending on the number of tracks desired on the discs. While a single head per track embodiment gives greatest access speed, other embodiments may use moving heads which are moved to access different recording tracks.

There has thus been disclosed a rapid access disc memory. Both the hub assembly which carries the rotating discs and the electric drive motor are mounted in cantilever fashion. This permits disassembly of either the motor or the hub assembly without removing the bearings. One of the bearings is located at or near the center of gravity of the hub and disc assembly, thus minimizing mechanical forces which may tend to deflect the disc or hub. The hub assembly may be locked against its drive shaft in such a manner that it may be precisely relocated again and without disturbing the mechanical relationship and the relative distances between the discs and their cooperating magnetic heads.

Figure 9:
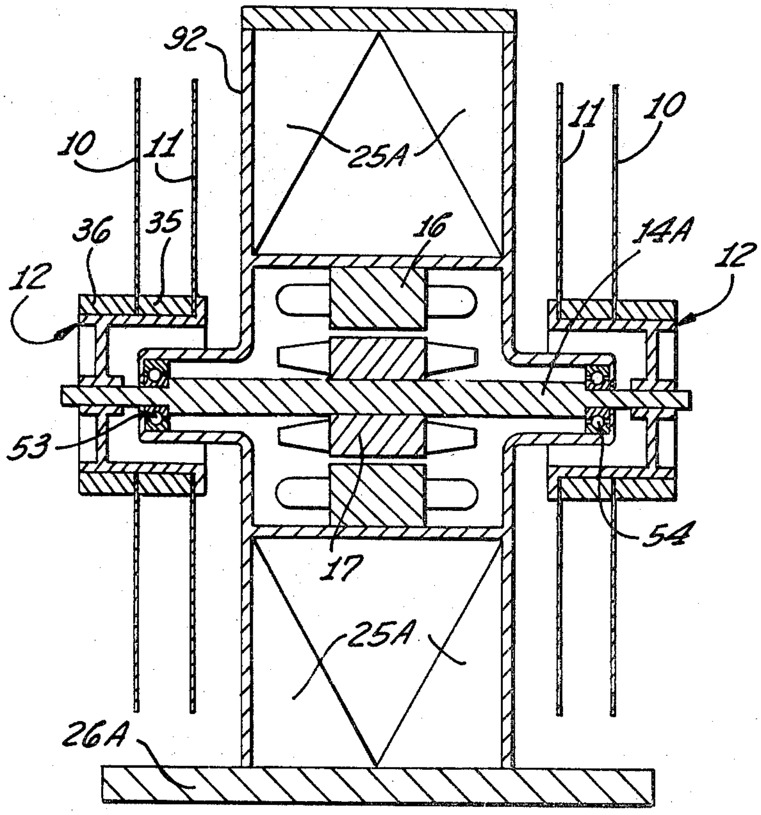
FIG. 9 is a side elevational view of an alternate embodiment illustrating a dual cantilevered hub structure.

FIG. 9 illustrates an alternative embodiment in which two cantilevered hubs are placed at opposite ends of the same common shaft. The motor rotor windings 17 are wound around the shaft **14*a* between the bearings instead of on a portion of the shaft 14*a* cantilevered outside the bearing. The alternative embodiment is supported by a dual bulkhead 92 and supporting structure 25*a* supported by a base plate 26**.

The invention and its attendant advantages will be understood from the foregoing description. It will be apparent that various changes may be made in the form, construction and arrangement of the parts of the invention without departing from the spirit and scope thereof or sacrificing its material advantages, the arrangement hereinbefore described being merely by way of example.

What is claimed is:

1. In a rotating magnetic disc memory for storing binary information for digital systems, a structure for maintaining to a high tolerance a predetermined separation between magnetic heads and a high-speed rotating disc comprising:
- a housing means including magnetic head supporting means;
- a high-speed rotating means shaped and supported for high-speed vibration free rotation at a speed of at least 1100 r.p.m.;
- said high-speed rotating means supported in said housing means by not more than two bearings, said bearings being high-speed bearings;
- said rotating means including a shaft, a first portion of which is inserted in said bearings to support said rotating means in rotating relationship to said housing means, and further including a disc assembly means rigidly connected to said first shaft portion;
- said disc assembly means including a second portion of said shaft cantilevered outside said bearings and a hub means including at least one magnetic rigid disc means mounted thereon in a plane transverse to the shaft axis, said disc means having an outside diameter at least seven times the diameter of the cantilevered shaft portion;
- a plurality of magnetic heads mounted on said head mounting means with their operative surfaces in a plane transverse to the axis of said shaft;
- each disc means having a plurality of recording tracks and one of said plurality of magnetic heads associated with each track; and
- said disc assembly means having its center of gravity located at the bearing at the junction between said first and second shaft portions.

2. In the rotating memory of claim 1, said magnetic head supporting means including means for supporting said heads at a distance of less than 70 microinches from the surface of said disc means.

3. In the rotating memory of claim 1, said housing means including the stationary portion of a driving means and said high-speed rotating means including the rotor of said driving means.

4. In the rotating memory of claim 1, said disc assembly means including alignment means for precisely removably positioning said disc means in the same transverse plane and the same axial location while said bearing means remain axially fixed with respect to said shaft.

5. In the rotating memory of claim 4, said alignment means including an inner sleeve secured to said hub means, a conical surface on said shaft, a first conical recess in one end of said sleeve engageable with said conical surface, a conical washer, a second conical recess in the opposite end of said sleeve engageable with said conical washer, and means for urging said washer against said sleeve and for similarly urging the said sleeve against said conical surface to facilitate the precise repositioning of said hub and included disc means after previous removal.

6. In the rotating memory of claim 5, said sleeve being of a relatively hard material with respect to said shaft and said hub and having a coefficient of expansion of a value between that of the coefficient of expansion of said shaft and the coefficient of expansion of said hub means.

7. In a rotating magnetic disc memory for storing binary information for digital systems, a structure for maintaining to a high tolerance a predetermined separation between magnetic heads and a high-speed rotating disc comprising:
- a housing means including magnetic head supporting means;
- a high-speed rotating means shaped and supported for high-speed vibration free rotation at a speed of at least 1100 r.p.m.;
- said rotating structure supported in said housing means by not more than two bearings, said bearings being high-speed bearings;
- said rotating means including a shaft, a first portion of which is inserted in said bearings to support said rotating means in rotating relationship to said housing means, and further including a disc assembly means rigidly connected to said first shaft portion;
- said disc assembly means including a second portion of said shaft cantilevered outside said bearings and including of hub means, said hub means including at least one magnetic disc means mounted thereon in a plane transverse to the shaft axis;
- at least one magnetic head mounted on said head supporting means with its operative surface in a plane transverse to the axis of said shaft;
- said disc means having a plurality of recording tracks on at least one face; and
- said disc assembly means having its center of gravity located at the bearing at the junction between said first and second shaft portions.

8. In the rotating memory of claim 7, said magnetic head supporting means including means for operatively supporting said heads at a distance of less than 40 microinches from the surface of said disc means.

9. In the rotating memory of claim 7, said disc means being of rigid nonflexible construction.

10. In the rotating memory of claim 9, said magnetic head supporting means including means for operatively supporting said heads at a distance of less than 70 microinches from the surface of said disc means.

11. In the rotating memory of claim 9, said housing means including the stationary portion of a driving means and said high-speed rotating means including the rotor of said driving means.

12. In a rotating magnetic disc memory for storing binary information for digital systems, a structure for maintaining to a high tolerance a predetermined separation between magnetic heads and a high-speed rotating disc comprising:

a housing means including magnetic head supporting means;

a high-speed bearing means;

a shaft means rotatable in said bearing means, said shaft means having a first cantilever portion extending from said bearing means;

a first assembly means comprising said first portion of said shaft means and a second means, said first assembly means having a center of gravity at a shaft support portion of said bearing means;

said second means removably connected to a connection area on the cantilevered first portion of said shaft means for rotation therewith, said second means including rigid magnetic disc means with a plurality of recording tracks and a magnetic head associated with each track and including means for offsetting the center of gravity of said first assembly means from said connection area;

said offsetting means including a portion extending over the shaft support portion of said bearing means in rotatable relationship thereto; and said magnetic supporting means having means for supporting said heads at a distance of less than 70 microinches from the surface of said disc means.

References Cited

UNITED STATES PATENTS

| | | | |
|---|---|---|---|
| 3,068,480 | 12/1962 | Fisher et al. | 346—74 |
| 3,159,823 | 12/1964 | Dow et al. | 340—174.1 |
| 3,161,729 | 12/1964 | McCarty | 340—174.1 |
| 3,187,317 | 6/1965 | Smith | 340—174.1 |
| 3,196,422 | 7/1965 | Cheney | 340—174.1 |

JAMES W. MOFFITT, Primary Examiner

W. F. WHITE, Assistant Examiner

U.S. Cl. X.R.

179—100.2